United States Patent [19]

McDaniel

[11] 3,774,692
[45] Nov. 27, 1973

[54] GARDEN PLOW APPARATUS

[76] Inventor: John D. McDaniel, Route #3, Box 185-A, McComb, Miss. 39648

[22] Filed: May 26, 1971

[21] Appl. No.: 146,923

[52] U.S. Cl. ............................. 172/258, 172/765
[51] Int. Cl. ........................................... A01b 69/00
[58] Field of Search .................... 172/92, 256, 258, 172/180, 122, 540, 554, 71, 765; 280/3, DIG. 7

[56] References Cited
UNITED STATES PATENTS

| | | | |
|---|---|---|---|
| 1,804,412 | 5/1931 | Glasier | 172/258 |
| 2,610,561 | 9/1952 | Roth et al. | 172/258 |
| 2,314,035 | 3/1943 | Dontje | 172/122 X |
| 1,550,291 | 8/1925 | Stull et al. | 172/258 X |
| 1,797,713 | 3/1931 | Brogelli | 280/DIG. 7 |

Primary Examiner—Stephen C. Pellegrino
Attorney—Alvin Edward Moore

[57] ABSTRACT

A horizontal U shaped frame is provided with a first horizontal transversely extending axle adjacent the curved portion of the member and supporting wheel means. A second axle parallel to the first and spaced rearward from the first is connected to the first by belt drive means. A motor supported on a platform extending between the side bars of the frame, at the rear of the wheel means, drives the second axle to drive the first axle and produce motive power. The user guides the apparatus by holding the free ends of the member legs. Plow means, pivotally secured to a third parallel axle disposed rearward of the motor and loaded by a small portion of the motor's weight, digs into the ground and provides plowing action as the member moves forward.

3 Claims, 4 Drawing Figures

PATENTED NOV 27 1973 3,774,692

INVENTOR:
JOHN D. MCDANIEL.

Alvin E. Moore,
ATTORNEY.

GARDEN PLOW APPARATUS

SUMMARY OF THE INVENTION

My invention is directed toward a self powered hand guided plow apparatus. To this end, I provide a frame comprising a horizontal U shaped member having a front curved portion and rearwardly extending side bars or legs. First and second spaced coplanar, parallel, horizontal, transversely extending axles or shafts, each rotatable about its own axis, extend between the legs adjacent the front portion, the first axle being closer to the front portion than the second axle. A third parallel axle coplanar with the other two axles, but nonrotatable, extends between the legs adjacent the free ends of the legs.

A platform extends between the legs intermediate the second and third axles. A gasoline powered motor is mounted on the platform and is coupled by a belt drive to the second axle. The second axle is coupled to the first axle by a second belt drive. The first axle carries roller means which rotates therewith and provides motive power. The roller means preferably has studs which provide ground aeration as the member is pulled forward along the ground.

Plow means pivotally disposed about the center of the third axle extends inclinedly forward between the legs. The user holds the free ends of the legs and moves forward with the frame and guides it. The plow means, weighted due to the location of the motor a short distance rearward of the driving wheel, provides the desired plowing action.

DETAILED DESCRIPTION OF PREFERRED EMBODIMENTS

Figure 1:
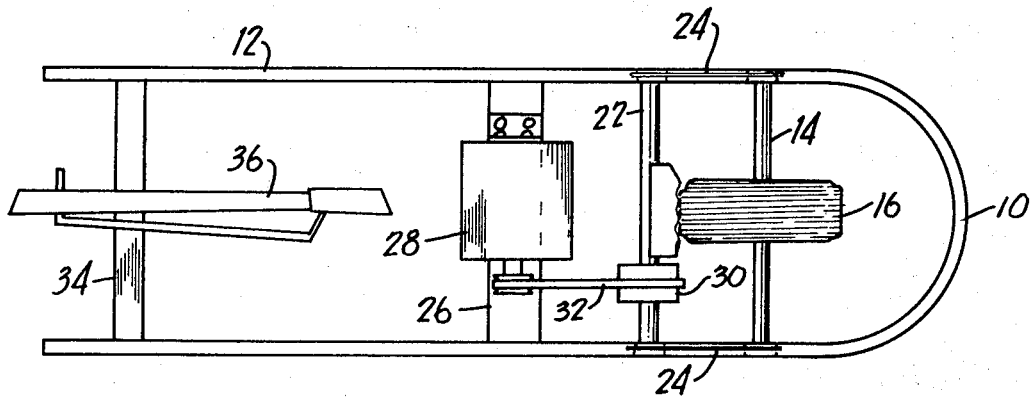
FIG. 1 is a plan view of one form of my invention.
Figure 2:
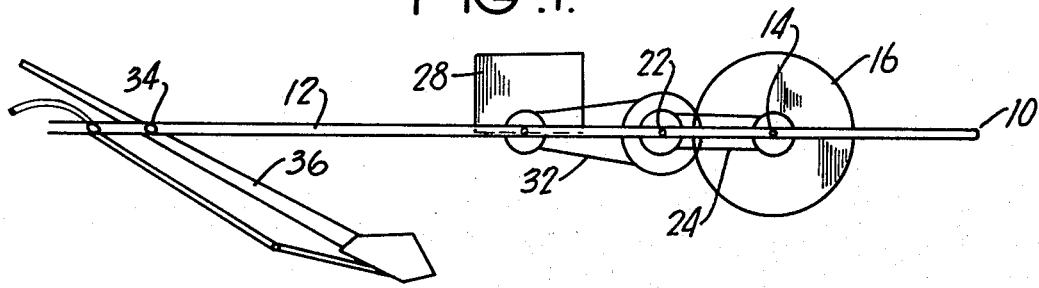
FIG. 2 is a side view thereof.
Figure 3:
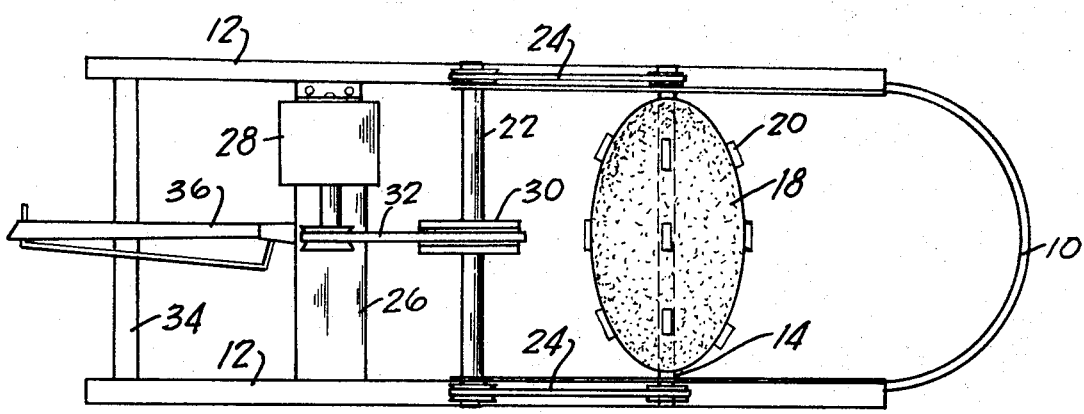
FIG. 3 is a plan view of another form of my invention.
Figure 4:
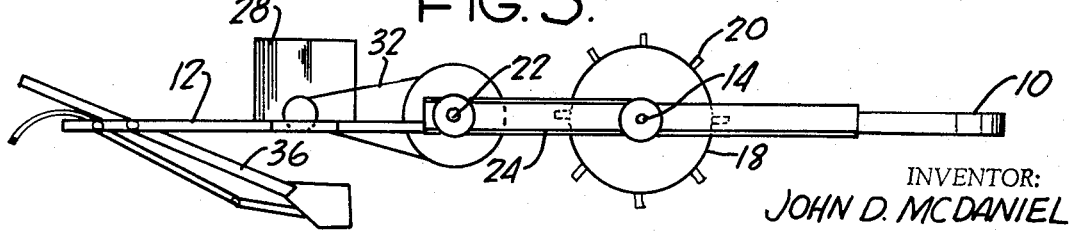
FIG. 4 is a side view of the plow of FIG. 3.

Referring now to FIGS. 1-4, a substantially planar, horizontal, U shaped member has a curved front section 10 and rearwardly extending parallel legs 12. Three spaced parallel axles lying in the plane of the member extend transversely between the legs. The first axle 14, rotatable about its axis, is disposed adjacent section 10. Wheel means disposed on and rotated by the axle 14 contacts the ground and provides forward motion. The wheel means may be the wheel 16 or an elongated egg shaped roller 18 with outwardly extending aeration prongs 20. When roller 18 is used, it provides forward motion but also aerates the soil it passes over. The studs 20 that are on the side portions of the periphery of the egg-shaped wheel are especially effective in aeration as they slantingly enter and leave the soil.

The second axle 22 is disposed adjacent the axle 14 and is connected thereto by belt drive means 24 at each end. Axle 22 is also rotatable about its axis.

A platform 26 horizontally spanning the legs adjacent axle 22 supports a gasoline motor 28 which is connected to a drive pulley 30 on the axle 22 by belt drive 32. Thus, the motor produces rotation of axle 22 which causes rotation of axle 14 and forward motion of the apparatus via the roller means.

The third axle 34, non rotatable about its axis, is disposed adjacent the free-end handle portions of the legs. Elongated plow means 36 extending inclinedly downward into the ground and forward from axle 34 is pivotally secured to the center thereof at a point intermediate front and rear ends. The motor-weighted plow means, which is on a lever arm to the fulcrum of the wheel that is longer than the lever arm between the wheel and the motor, digs into the soil.

The user holds the free ends of the legs and guides the apparatus as previously described.

While I have described my invention with particular reference to the drawings, such is not to be considered as limiting its actual scope.

I claim:
1. Plow apparatus, comprising:
   a frame, including: two spaced, elongated side bars, having rearward free-ended handle portions, adapted to be grasped by an operator of the apparatus; and a motor-supporting platform, between and rigidly connected to said side bars;
   a plow-supporting axle, forward of said handle portions, between and attached to said side bars;
   plow means pivotally mounted on said plow-supporting axle and in use extending downward into the ground;
   bearing means providing for pivotal movement of said plow means relatively to said frame;
   a wheel axle, forward of said platform, connected to said side bars and spanning the space between them;
   driving-wheel means on said wheel axle, comprising: a driving wheel having an egg-shaped periphery, cross-sectionally central portions of said periphery being aligned with said plow means; and soil-aerating studs, fixed to said periphery, at least part of said studs being located on side portions of said periphery, out of alignment with said plow means, adapted to slantingly enter and leave the soil;
   motor means; mounted on said platform; and
   power-transmission means, connected to said motor and to said wheel means, for transmitting power to the wheel means.

2. Plow apparatus as set forth in claim 1, in which: the said frame is U-shaped and rigid and includes a forward cross bar, between and rigidly connected to forward ends of said side bars; the part of each of said bars between its forward end and its handle portion is substantially straight; the said wheel axle is rotatably connected to said side bars; said driving-wheel means is rigidly attached to the wheel axle; said motor means is adjacent to and rearward of said wheel means; said power-transmission means is drivingly connected to and rotates said wheel means; the said plow-supporting axle is adjacent to said handle portions; and the distance between said last-named axle and said platform is greater than the distance between said wheel axle and the platform.

3. Apparatus as set forth in claim 1, in which said power-transmission means comprises: a rotary motor shaft; gearing means on said shaft; a second shaft, rotatably connected to said side bars and spanning the space between them; and gearing means on said second shaft, power-transmittingly connected to said motor shaft and to said wheel axle.

* * * * *